United States Patent
Okamura (10) Patent No.: US 8,428,387 B2
(45) Date of Patent: Apr. 23, 2013

(54) EDGE EVALUATION METHOD, EDGE DETECTION METHOD, IMAGE CORRECTION METHOD, AND IMAGE PROCESSING SYSTEM

(75) Inventor: Shoichi Okamura, Kyoto (JP)

(73) Assignee: Shimadzu Corporation, Kyoto (JP)

( * ) Notice: Subject to any disclaimer, the term of this patent is extended or adjusted under 35 U.S.C. 154(b) by 901 days.

(21) Appl. No.: 12/529,930

(22) PCT Filed: Mar. 6, 2007

(86) PCT No.: PCT/JP2007/054282
§ 371 (c)(1),
(2), (4) Date: Sep. 4, 2009

(87) PCT Pub. No.: WO2008/107970
PCT Pub. Date: Sep. 12, 2008

(65) Prior Publication Data
US 2010/0111394 A1     May 6, 2010

(51) Int. Cl.
*G06K 9/40*       (2006.01)
(52) U.S. Cl.
USPC .......................................... 382/266; 382/269
(58) Field of Classification Search .................. None
See application file for complete search history.

(56) References Cited

U.S. PATENT DOCUMENTS

| 2005/0069187 A1 | 3/2005 | Kaji |
| 2008/0307373 A1* | 12/2008 | Kobayashi .................. 716/4 |

FOREIGN PATENT DOCUMENTS

| JP | 7-134418 A | 5/1995 |
| JP | 2005-109867 A | 4/2005 |
| JP | 2005-322044 A | 11/2005 |
| JP | 2006-301881 A | 11/2006 |
| JP | 2006-346248 A | 12/2006 |

OTHER PUBLICATIONS

International Search Report for the Application No. PCT/JP2007/054282 mailed Apr. 3, 2007.

* cited by examiner

*Primary Examiner* — Claire X Wang
*Assistant Examiner* — David Perlman
(74) *Attorney, Agent, or Firm* — Cheng Law Group, PLLC (57) ABSTRACT

An image processing system of this invention includes a variation calculator for calculating a variation in pixel value of each pixel relative to adjacent pixels, and an edge degree calculating device for calculating, for one arbitrary pixel, an edge degree which expresses numerically a probability of the one pixel being an edge, based on variations of a peripheral pixel group consisting of the one pixel and surrounding pixels. According to the image processing system constructed in this way, whether edges or not can be evaluated with high accuracy even when the pixels undergoing noise.

18 Claims, 10 Drawing Sheets

Fig. 11

EDGE EVALUATION METHOD, EDGE DETECTION METHOD, IMAGE CORRECTION METHOD, AND IMAGE PROCESSING SYSTEM

TECHNICAL FIELD

This invention relates to an edge evaluation method, edge detection method, image correction method and image processing system, and more particularly to a technique of evaluating probabilities that pixels constituting image data are edges.

BACKGROUND ART

Conventionally, edge detection is carried out for image data obtained from X-ray imaging apparatus, non-destructive testing apparatus and so on. This process is an important step often used for improvement in image quality such as avoidance of artifacts due to vertical luminance differences, or for automatic detection of tissues and lesions.

Most basically, there is a method which finds a difference in pixel value to adjacent pixels, and determines the pixel to be an edge or tissue boundary when the difference is large. There is also a method which highlights a variation by applying a high pass filter (HPF) to image data, and determines the pixel to be an edge or tissue boundary when its value is large (see Patent Document 1, for example).

[Patent Document 1]
Patent Application H7-134418

DISCLOSURE OF THE INVENTION

Problem to be Solved by the Invention

However, the above methods have an inconvenience that the accuracy of edge detection lowers when pixel values are unstable under the influence of noise or the like. On the other hand, there is a method (e.g. Snake method) which maintains or improves accuracy, for example, by introducing an assumption "An outline is a closed contour." However, there are inconveniences that this requires a manual preparation, and that accuracy lowers in the cases of deviation from the assumption.

This invention has been made having regard to the state of the art noted above, and its object is to provide an edge evaluation method, edge detection method, image correction method and image processing system which can accurately evaluate probabilities of pixels being edges.

Means for Solving the Problem

To fulfill the above object, this invention provides the following construction.

An edge evaluation method for evaluating probabilities that pixels constituting image data are edges, according to this invention, comprises a variation calculating step for calculating a variation in pixel value of each pixel relative to adjacent pixels; and an edge degree calculating step for calculating, for one arbitrary pixel, an edge degree which expresses numerically a probability of the one pixel being an edge, based on variations of a peripheral pixel group consisting of the one pixel and surrounding pixels.

With the edge evaluation method of this invention, the edge degree calculating step calculates an edge degree of one pixel based on a plurality of variations of the one pixel and surrounding pixels. This enables an accurate evaluation of a probability of the one pixel being an edge.

An image processing system for evaluating probabilities that pixels constituting image data are edges, according to this invention, comprises a variation calculating device for calculating a variation in pixel value of each pixel relative to adjacent pixels; and an edge degree calculating device for calculating, for one arbitrary pixel, an edge degree which expresses numerically a probability of the one pixel being an edge, based on variations of a peripheral pixel group consisting of the one pixel and surrounding pixels.

With the image processing system of this invention, the edge degree calculating device calculates an edge degree of one pixel based on a plurality of variations of the one pixel and surrounding pixels. This enables an accurate evaluation of a probability of the one pixel being an edge.

In the edge evaluation method and image processing system of this invention, it is preferred that, when a total of absolute values substituting for the variations of the peripheral pixel group is regarded as a variation range summation; and an absolute value of a total of the variations per se of the peripheral pixel group is regarded as a variation increase and decrease range; the edge degree is a ratio of the variation increase and decrease range to the variation range summation, or a value corresponding to the ratio. The edge degree shows such a tendency that the probability of one pixel being an edge is the higher when the variations of the peripheral pixel group of the pixel correspond the more closely to either an increase or a decrease, and that the probability of being an edge is the lower when the increase/decrease in the variations of the peripheral pixel group varies the more widely. Since the edge degree has such a tendency, the accuracy of the edge degree can be prevented from being lowered by the influence of noise, for example.

In the edge evaluation method and image processing system of this invention, it is preferred that the peripheral pixel group corresponding to the one pixel is a set of pixels present in an area substantially around the one pixel. The edge degrees of pixels can be determined with high accuracy.

In the edge evaluation method and image processing system of this invention, it is preferred that the image data is 2D image data or 3D image data. Application can be made effectively to either 2D image data or 3D image data.

In the edge evaluation method of this invention, it is preferred that the adjacent pixels are a plurality of pixels adjoining each pixel in different directions; the variation calculating step calculates the variations separately for the respective adjoining directions of the pixels adjacent each pixel; and the edge degree calculating step calculates the edge degree of one pixel separately for each variation corresponding to each direction. The edge degree can be calculated effectively regardless of a direction of a gradient of variations in the pixel value.

In the edge evaluation method of this invention, it is preferred that the edge degree calculating step further acquires a combined edge degree by combining the edge degrees in the respective directions. The combined edge degree can be calculated effectively regardless of a direction of a gradient of variations in the pixel value.

In the image processing system of this invention, it is preferred that the adjacent pixels are a plurality of pixels adjoining each pixel in different directions; the variation calculating device calculates the variations separately for the respective adjoining directions of the pixels adjacent each pixel; and the edge degree calculating device calculates the edge degree of one pixel separately for each variation corresponding to each direction. A combined edge degree can be calculated effectively regardless of a direction of a gradient of variations in the pixel value.

In the image processing system of this invention, it is preferred that the edge degree calculating step further acquires a combined edge degree by combining the edge degrees in the respective directions. The combined edge degree can be calculated effectively regardless of a direction of a gradient of variations in the pixel value.

In the image processing system of this invention, it is preferred that the system further comprises an edge detecting device for determining, based on a result of the edge degree being compared with a threshold value, that the one pixel is an edge. Pixels which are edges can be detected with high accuracy.

In the image processing system of this invention, it is preferred that the system further comprises an image correcting device for correcting a pixel value of the one pixel based on the edge degree. Image data can be corrected effectively according to the edge degree.

In the image processing system of this invention, it is preferred that the edge degree calculating device calculates the edge degree of each pixel constituting the image data. Edge degrees can be calculated for all pixels in the image data.

In the image processing system of this invention, it is preferred that the system further comprises an input device for designating pixels for which the edge degree should be calculated, wherein the edge degree calculating device calculates the edge degree of the pixels designated by the input device. Pixels for calculating the edge degrees of the image data can be designated conveniently.

In the image processing system of this invention, it is preferred that the system further comprises an output device for outputting the edge degree. The edge degree calculated can be outputted to outside conveniently.

In the image processing system of this invention, it is preferred that the image data can be inputted from outside. A process can be carried out for calculating the edge degree for various image data.

An edge detection method for detecting that pixels constituting image data are edges, according to this invention, comprises a variation calculating step for calculating a variation in pixel value of each pixel relative to adjacent pixels; an edge degree calculating step for calculating, for one arbitrary pixel, an edge degree which expresses numerically a probability of the one pixel being an edge, based on variations of a peripheral pixel group consisting of the one pixel and surrounding pixels; and an edge detecting step for determining, based on a result of the edge degree being compared with a threshold value, that the one pixel is an edge.

With the edge detection method of this invention, the edge degree calculating step calculates an edge degree of one pixel based on a plurality of variations of the one pixel and surrounding pixels. This enables an accurate evaluation of a probability of the one pixel being an edge. Therefore, pixels which are edges can be detected with high accuracy.

An image correction method for correcting pixel values of pixels constituting image data, according to this invention, comprises a variation calculating step for calculating a variation in pixel value of each pixel relative to adjacent pixels; an edge degree calculating step for calculating, for one arbitrary pixel, an edge degree which expresses numerically a probability of the one pixel being an edge, based on variations of a peripheral pixel group consisting of the one pixel and surrounding pixels; and an image correcting step for correcting a pixel value of the one pixel based on the edge degree.

With the image correction method of this invention, the edge degree calculating step calculates an edge degree of one pixel based on a plurality of variations of the one pixel and surrounding pixels. This enables an accurate evaluation of a probability of the one pixel being an edge. Therefore, image data corrected according to edge degrees can be created effectively.

Effects of the Invention

With the edge evaluation method, edge detection method, image correction method and image processing system according to this invention, the edge degree calculating step calculates an edge degree of one pixel based on a plurality of variations of the one pixel and surrounding pixels. This enables an accurate evaluation of a probability of the one pixel being an edge.

| [Description of References] | |
|---|---|
| 13 | image processor |
| 15 | input unit |
| 17 | output unit |
| 21 | variation calculator |
| 23 | edge degree calculator |
| 25 | edge detector |
| 26 | image corrector |
| M | subject |

EMBODIMENT 1

Embodiment 1 of this invention will be described hereinafter with reference to the drawings.

Figure 1:
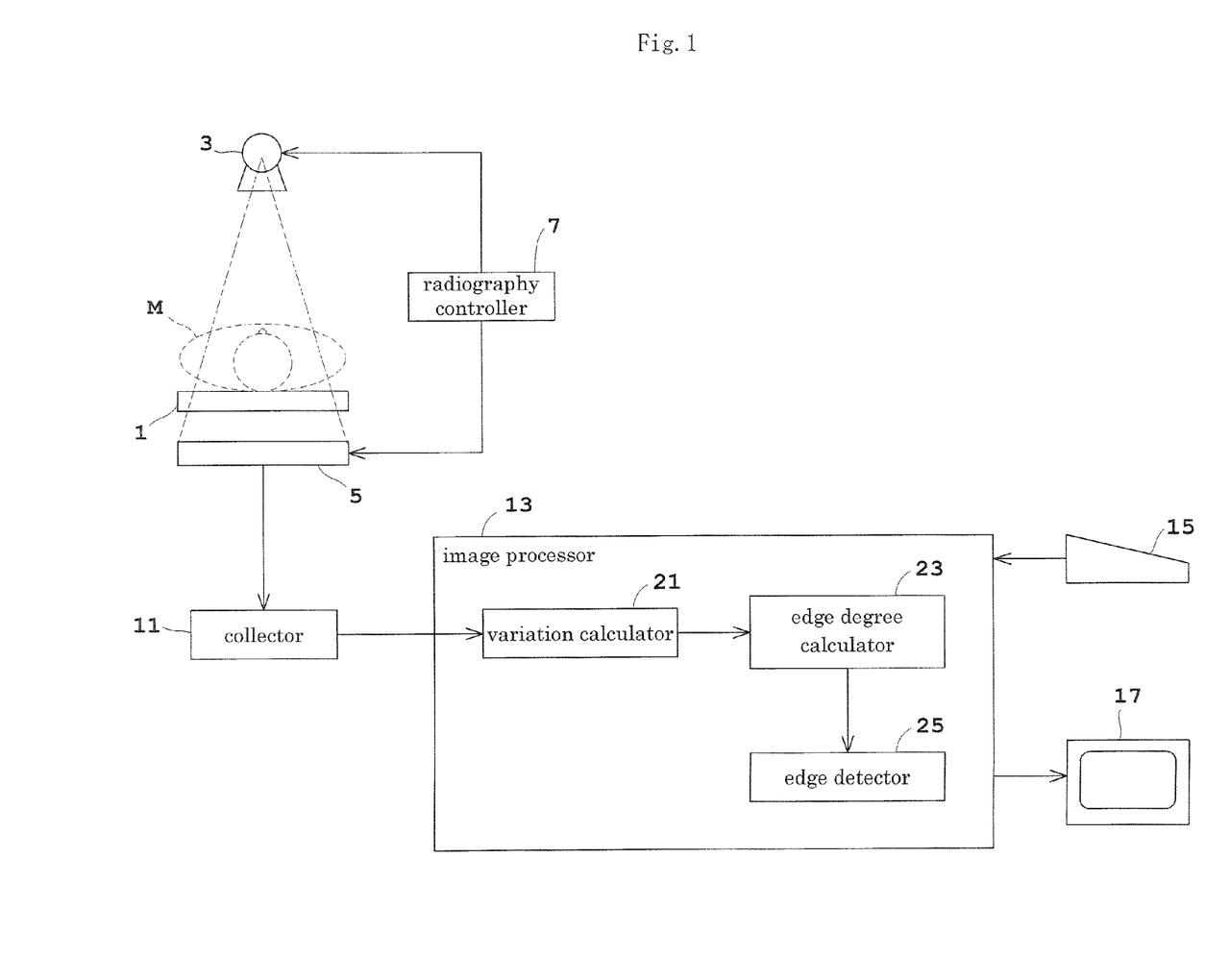
FIG. 1 is a block diagram showing an outline of an X-ray imaging apparatus according to Embodiment 1.

FIG. 1 is a block diagram showing an outline of an X-ray imaging apparatus according to Embodiment 1.

A top board 1 is formed of an X-ray transmissive material, and supports a subject M placed thereon for examination. An X-ray tube 3 and a flat panel X-ray detector (hereinafter referred to simply as "FPD" as appropriate) 5 are arranged opposite each other across the top board 1. The X-ray tube 3 irradiates the subject M with X-rays. The FPD 5 detects X-rays transmitted through the subject M, and outputs detection signals corresponding to intensities of the X-rays. The X-ray tube 3 and FPD 5 are connected to a radiography controller 7, and this radiography controller 7 has an operating unit, not shown, connected thereto. The operating unit receives instructions (e.g. instructions concerning X-ray emission intensity and irradiation time of the X-ray tube 3, an amplification level in the FPD 5 and so on) from the radiographer, and outputs them to the radiography controller 7. Based on the instructions of this operator, the radiography controller 7 causes the X-ray tube 3 to emit X-rays and the FPD 5 to detect the X-rays.

A collector 11 collects the detection signals outputted from the FPD 5, and outputs input image data corresponding to the collected detection signals to an image processor 13. The image processor 13 has a variation calculator 21, an edge degree calculator 23 and an edge detector 25 for carrying out image processing on the input image data.

The variation calculator 21 carries out an arithmetic process to obtain variations in pixel value relative to adjacent pixels of each pixel constituting the input image data. The variations have a direction of either increase or decrease, and take positive or negative values corresponding thereto.

The edge degree calculator 23 carries out an arithmetic process to derive an edge degree evaluating (expressing numerically) the probability of one pixel being an edge, from the variations of the pixel and surrounding pixels (these pixels being collectively called hereinafter a peripheral pixel group).

More particularly, the edge degree calculator 23 determines a ratio of "variation increase and decrease range" to "variation range summation", or a value corresponding thereto, to be an edge degree of a pixel concerned, where the "variation range summation" is a total of absolute values substituting for respective variations of the peripheral pixel group, and the "variation increase and decrease range" is an absolute value of a total of the respective variations per se of the peripheral pixel group.

Since the edge degree is an index of the probability of the pixel being an edge as noted hereinbefore, it is preferable to express the edge degree, using decimals from 0 to 1, or percentage (%). That "the pixel is an edge" signifies that the pixel corresponds to an outline or boundary of the whole or part of the subject M.

The edge detector 25 determines that a pixel is an edge, from a result of comparing the edge degree with a threshold value.

This image processor 13 is realized by a central processing unit (CPU) which reads and executes a predetermined program, and storage media such as a RAM (Random-Access Memory) and a fixed disk which store a variety of information.

The image processor 13 has an input unit 15 and an output unit 17 connected thereto. The input unit 15 includes a keyboard, a mouse and the like. The output unit 17 includes a monitor and the like. The input unit 15 receives instructions from the operator, and outputs them to the image processor 13. The instructions include, for example, instructions relating to setting of a threshold value, instructions designating pixels for which the edge degree should be calculated or edge detection should be carried out, and instructions relating to output of the result of each arithmetic process. The output unit 17 outputs results of arithmetic processes (variations, edge degrees and pixels at edges) of the image processor 13 as appropriate on instructions of the operator. The image processor 13, input unit 15 and output unit 17 correspond to the image processing system in this invention.

Figure 2:
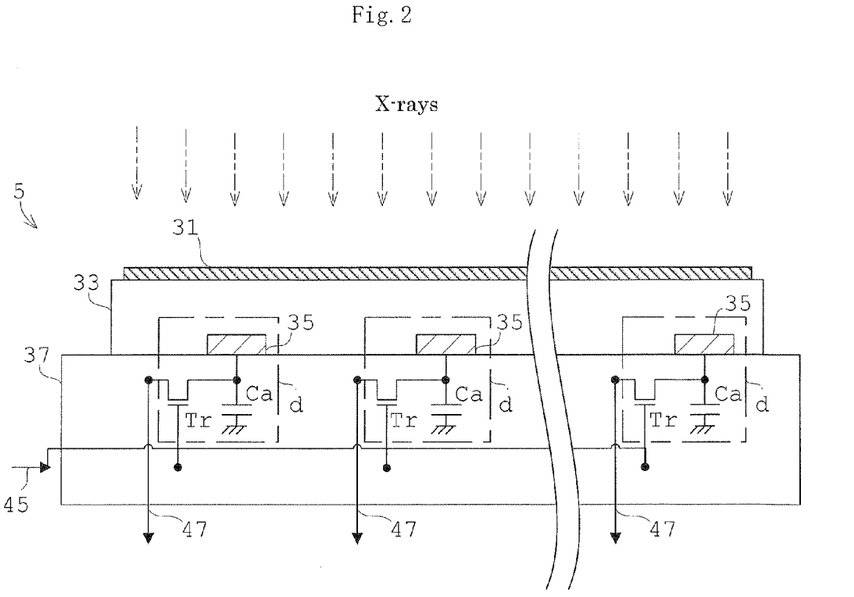
FIG. 2 is a view in vertical section of a principal portion of an FPD.
Figure 3:
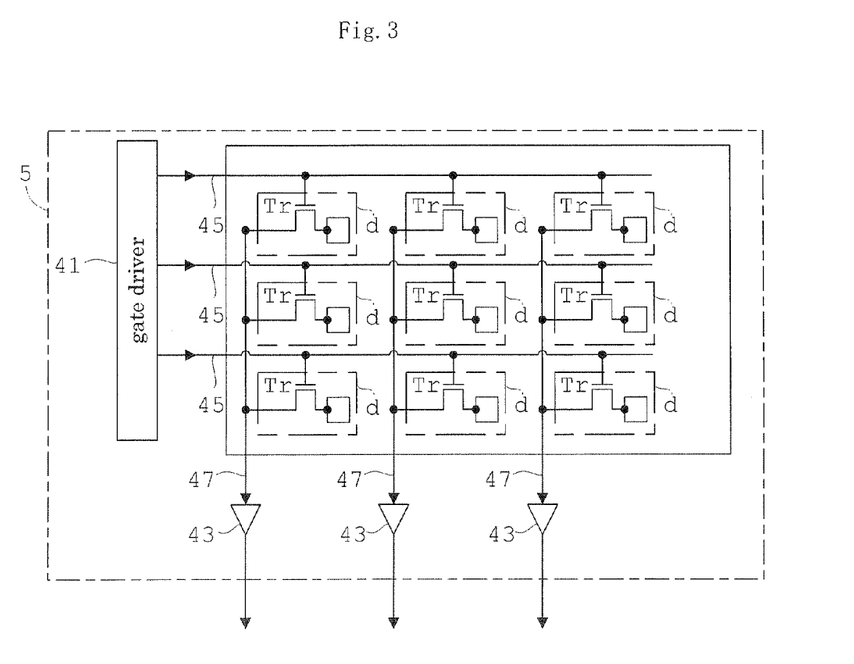
FIG. 3 is a plan view of the FPD.

The construction of FPD 5 will be described with reference to FIGS. 2 and 3. FIG. 2 is a view in vertical section of a principal portion of the FPD. FIG. 3 is a plan view of the FPD.

The FPD 5 has an application electrode 31, an X-ray sensitive semiconductor film 33, carrier collection electrodes 35 and an active matrix substrate 37 which are laminated in order from the X-ray incidence side. The FPD 5 further includes a gate driver 41 and amplifiers 43.

The carrier collection electrodes 35 are formed separately in a two-dimensional matrix in plan view. The active matrix substrate 37 has, formed separately thereon, capacitors Ca for storing charge information for the respective carrier collection electrodes 35, and thin film transistors Tr which are switching elements for fetching the charge information. The carrier collection electrodes 35 and capacitors Ca are connected to the sources of the thin film transistors Tr. One set of these carrier collection electrode 35, capacitor Ca and thin film transistor Tr constitutes one detecting element d. Numerous detecting elements d are arranged in rows and columns on the detecting plane of the FPD 5 (e.g. 4096 rows×4096 columns in an area of about 30 cm lengthwise×30 cm crosswise). Since the respective detecting elements d are in a corresponding relationship with the pixels noted hereinbefore, the input image data inputted to the image processor 13 has high resolution. The size of one pixel is 150 μm square, for example.

The active matrix substrate 37 has gate bus lines 45 laid and formed thereon for the respective rows of detecting elements d, and data bus lines 47 laid and formed thereon for the respective columns of detecting elements d. Each gate bus line 45 electrically connects the gates of the thin-film transistors Tr in each row en bloc to the gate driver 41. Each data bus line 47 electrically connects the drains of the thin-film transistors Tr in each column line to an amplifier 43. An analog-to-digital converter not shown is disposed at output sides of the amplifiers 43.

When X-rays fall on the FPD 5 in a state of a bias voltage applied to the application electrode 31, electric charges are generated in the semiconductor film 33. These electric charges are stored in the capacitors Ca through the respective carrier collection electrodes 35. The gate bus lines 45 transmit scan signals from the gate driver 41 to the gates of the thin-film transistors Tr. Through the thin-film transistors Tr turned to ON state as a result, the charge information stored in the capacitors Ca is read onto the data bus lines 47. The charge information read through the respective data bus lines 47 is amplified by the amplifiers 43. Subsequently, it is digitized by the analog-to-digital converter, and is outputted as detection signals.

Figure 4:
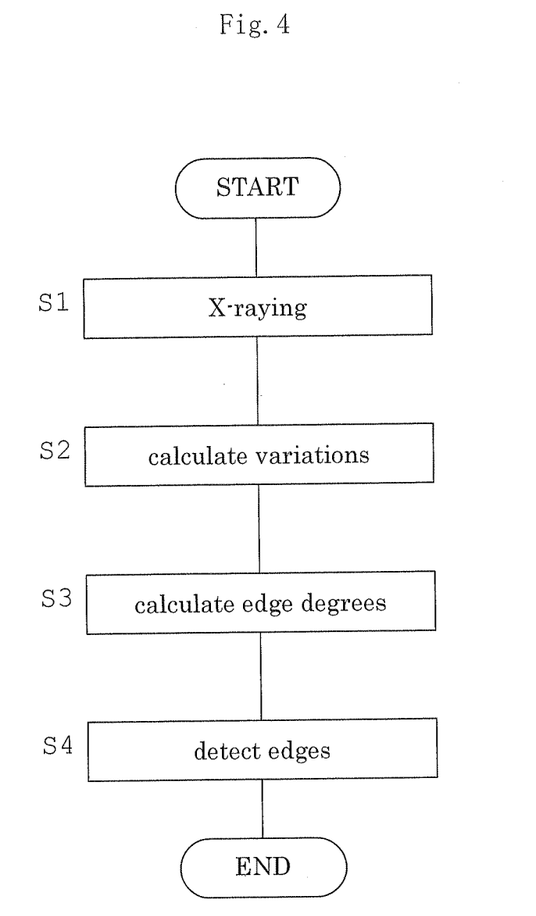
FIG. 4 is a flow chart showing a sequence of operation of the X-ray imaging apparatus.

Next, operation of the X-ray imaging apparatus according to Embodiment 1 will be described centering on the processes by the image processor 13. FIG. 4 is a flow chart showing a sequence of operation of the X-ray imaging apparatus. A case of carrying out edge detection for all pixels will be described below.

<Step S1> X-Raying

Under control of the radiography controller 7, the X-ray tube 3 emits X-rays toward the subject M. The FPD 5 detects X-rays transmitted through the subject M, and outputs acquired detection signals to the collector 11. The collector 11 outputs input image data corresponding to the collected detection signals to the image processor 13.

<Step S2> Calculate Variations (Variation Calculating Step)

Figure 5:
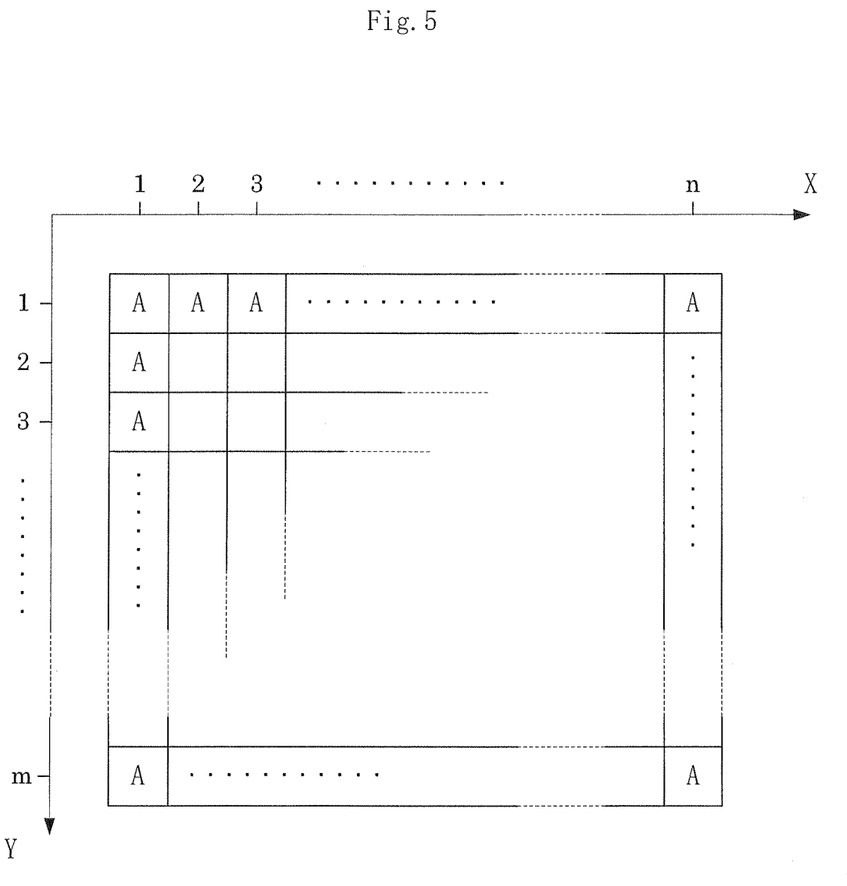
FIG. 5 is a schematic view showing an example of input image data.

The variation calculator 21 carries out an arithmetic process for calculating a variation of each pixel. This will particularly be described with reference to FIG. 5. FIG. 5 is a schematic view showing an example of input image data. It is assumed that, as shown, the input image data is two-dimensional image data in which pixels are arranged in rows and columns, or in two, transverse and longitudinal directions perpendicular to each other. For expediency of description, the transverse direction is regarded as X-axis, and the longitudinal direction as Y-axis, with each pixel identified by row number x in the transverse direction and column number y in the longitudinal direction. The pixel value of each pixel is written A(x, y). In FIG. 5, only "A" is written, and the row and column numbers (x, y) are omitted. In the following description also, the row and column numbers (x, y) are omitted as appropriate.

The variation calculator 21 calculates a variation SX in pixel value A of each pixel relative to adjacent pixels in the transverse direction. For example, a variation SX of each pixel is calculated on the basis that the variation SX(x, y) corresponds to a difference between pixel value A(x+1, y) of the right adjacent pixel and pixel value A (x−1, y) of the left adjacent pixel, divided by 2. A relational expression between variation SX and pixel value A in this case is shown in Mathematical Expression 1.

$$SX(x, y) = \frac{A(x+1, y) - A(x-1, y)}{2} \quad \text{[Math 1]}$$

The variation SX of each pixel calculated is outputted to the edge degree calculator 23.

<Step S3> Calculate Edge Degrees (Edge Degree Calculating Step)

Figure 6:
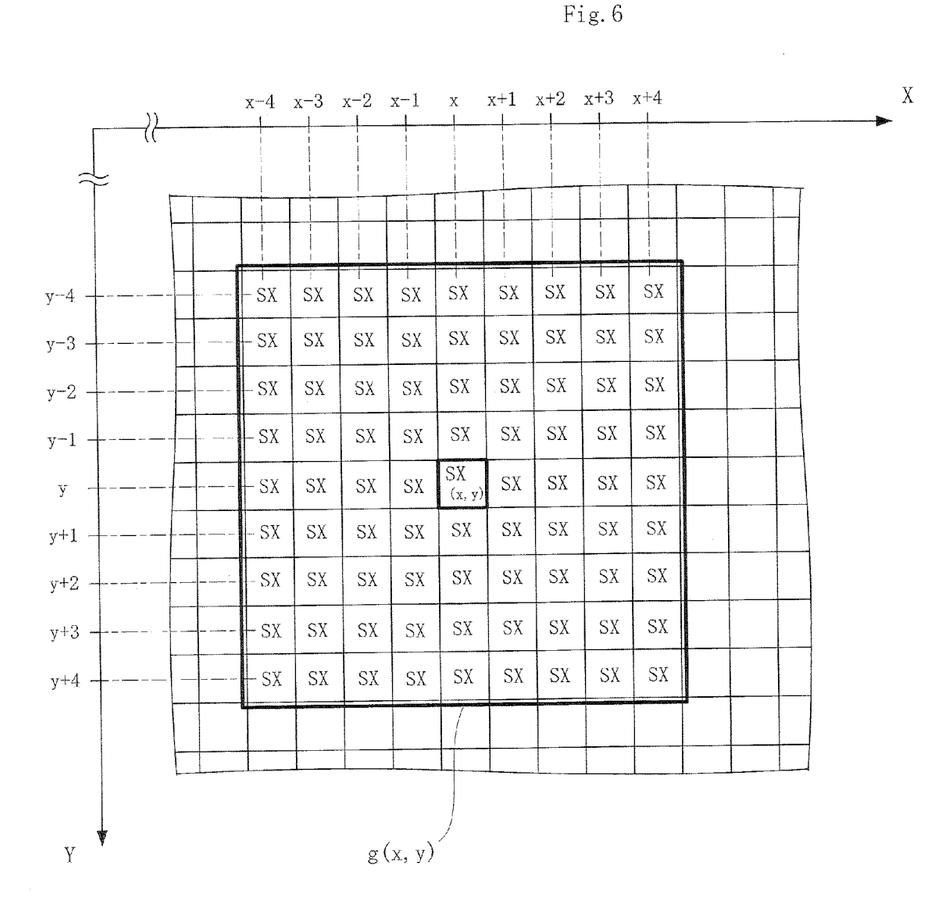
FIG. 6 is a view schematically showing a peripheral pixel group.

The edge degree calculator 23 carries out an arithmetic process for deriving an edge degree of each pixel from variations SX of a peripheral pixel group corresponding to each pixel. A peripheral pixel group includes, for example, a total of 81 pixels in nine rows and nine columns centering on that pixel. FIG. 6 is a view schematically showing the peripheral pixel group in this case. As shown, the pixels are arranged in rows and columns along the X-axis and Y-axis as in FIG. 5, and the variation of each pixel is written "SX" for expediency. And the peripheral pixel group g(x, y) of the pixel (x, y) is a set of 81 pixels shown.

The edge degree calculator 23 calculates edge degree RX of each pixel on the basis that the edge degree RX is a ratio of "variation increase and decrease range" to "variation range summation" as noted hereinbefore. A relational expression between edge degree RX and variation SX in this case is shown in Mathematical Expression 2.

$$RX(x, y) = \frac{\left| \sum_{j=-4}^{j=4} \sum_{i=-4}^{i=4} SX(x+i, y+j) \right|}{\sum_{j=-4}^{j=4} \sum_{i=-4}^{i=4} |SX(x+i, y+j)|} \quad \text{[Math 2]}$$

The edge degrees RX calculated in this way take values 0 to 1 inclusive. A pixel having the closer value to 1 has the higher probability of being an edge. The variation RX of each pixel is outputted to the edge detector 25.

<Step S4> Detect Edges (Edge Detecting Step)

The edge detector 25 compares the edge degree RX of each pixel with the threshold value. The threshold value is 0.5, for example. The pixel is determined to be an edge only when the edge degree RX corresponds to the threshold value or higher.

Then, on instructions of the operator, the image processor 13 outputs results of the arithmetic processes of the variation calculator 21, edge degree calculator 23 and edge detector 25 (e.g. a distribution of variations SX, a distribution of edge degrees RX or a distribution of pixels determined to be edges) as appropriate to the output unit 17. The results of processes of the edge detector 25 constitute binarized image data which adds edge enhancement to the input image data.

Thus, with the image processing system provided for the X-ray imaging apparatus according to Embodiment 1, the edge degree calculator 23 calculates edge degrees RX based on a plurality of variations SX of the peripheral pixel group g. This enables an accurate evaluation that the pixels are edges.

Specifically, the edge degrees RX tend to be the closer to 1 when directions of the variations SX of the peripheral pixel group g correspond the more closely to either an increase or a decrease, and to be the closer to 0 when the directions of the variations SX of the peripheral pixel group g vary to the greater extent. Here, the smaller the variations SX are, the directions of the variations SX are the more easily reversible by the influence of noise. Therefore, the smaller each variation SX of the peripheral pixel group g is, the edge degree RX tends to become lower the more easily. In other words, the pixel for which edge degree RX is determined is only one pixel in the peripheral pixel group g, and the value of edge degree RX is not greatly influenced just because the pixel is undergoing noise.

On the other hand, when each variation SX is so large as to overcome the influence of noise, it is unthinkable that the direction of variations SX has been reversed by the influence of noise. In this case, the more similar the directions (increase or decrease) of the variations SX of the peripheral pixel group g are, the higher the edge degrees RX tend to be, and the values of edge degrees RX never lower just because each pixel is influenced by noise.

Thus, since the edge degrees RX are calculated from the variations SX of the peripheral pixel group g rather than the variation SX of one pixel, even if that pixel undergoes noise, whether edges or not can be evaluated accurately.

Particularly with the input image data collected with high resolution as by the FPD 5, the pixels are smaller in size than the edges, and the width of the edges often covers a plurality of pixels. Thus, the accuracy of edge degrees RX improves to the greater extent, the smaller the size of the pixels is relative to the edges. As a result, it is possible to avoid artifacts occurring in subsequent processes. This can also increase the possibility of automatic diagnosis.

The pixels forming edges can be detected reliably by the edge detector 25 which compares such edge degrees RX with the threshold value.

EMBODIMENT 2

Figure 7:
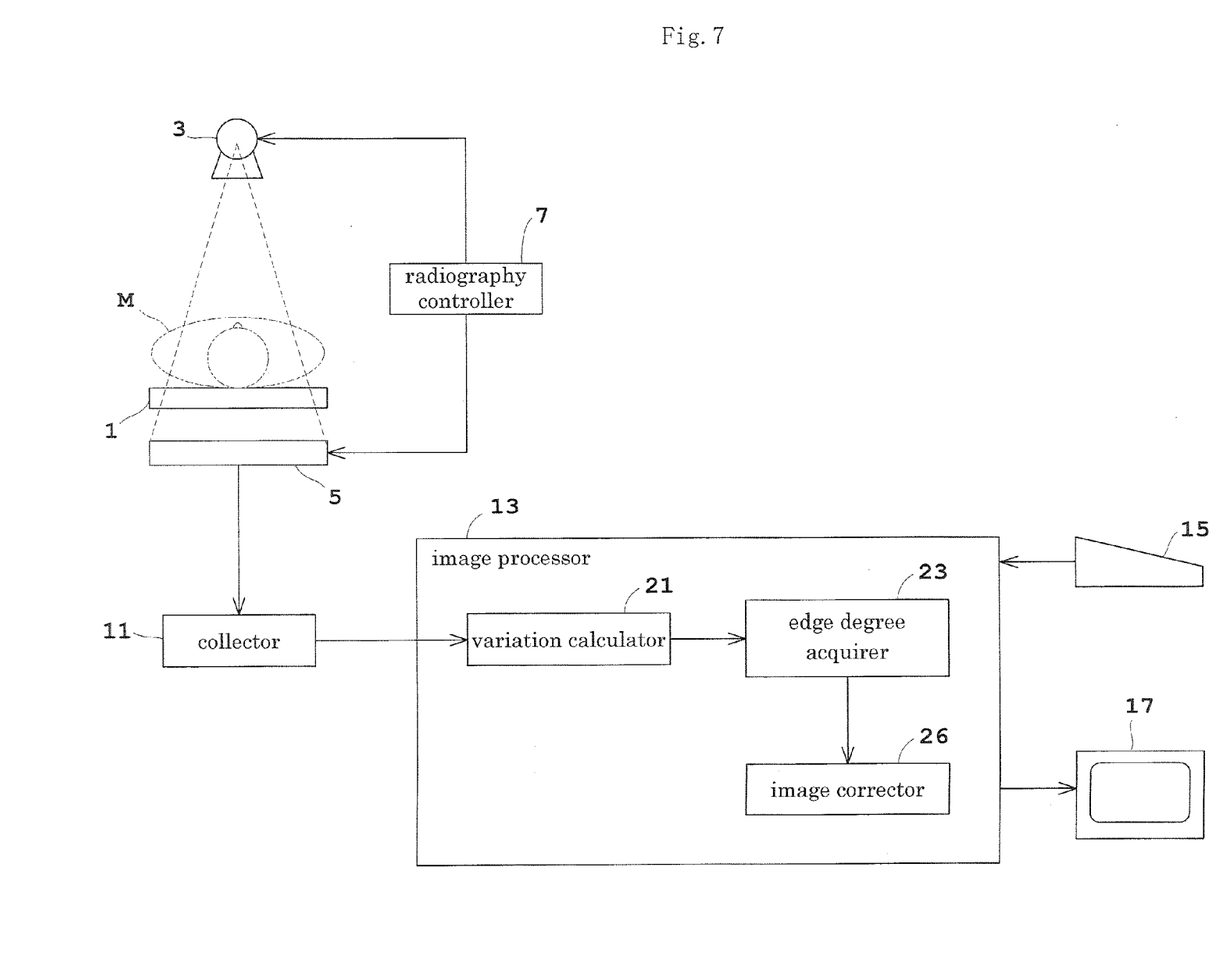
FIG. 7 is a block diagram showing an outline of an X-ray imaging apparatus according to Embodiment 2.

Embodiment 2 of this invention will be described hereinafter with reference to the drawings. FIG. 7 is a block diagram showing an outline of an X-ray imaging apparatus according to Embodiment 2. Parts identical to those of Embodiment 1 are affixed with the same signs, and will not particularly be described.

The image processor 13 in Embodiment 2 includes an image corrector 26 for carrying out an arithmetic process to correct input image data. In this embodiment, the image corrector 26 creates corrected images by replacing a pixel value of each pixel with a gray scale value corresponding to its edge degree.

Figure 8:
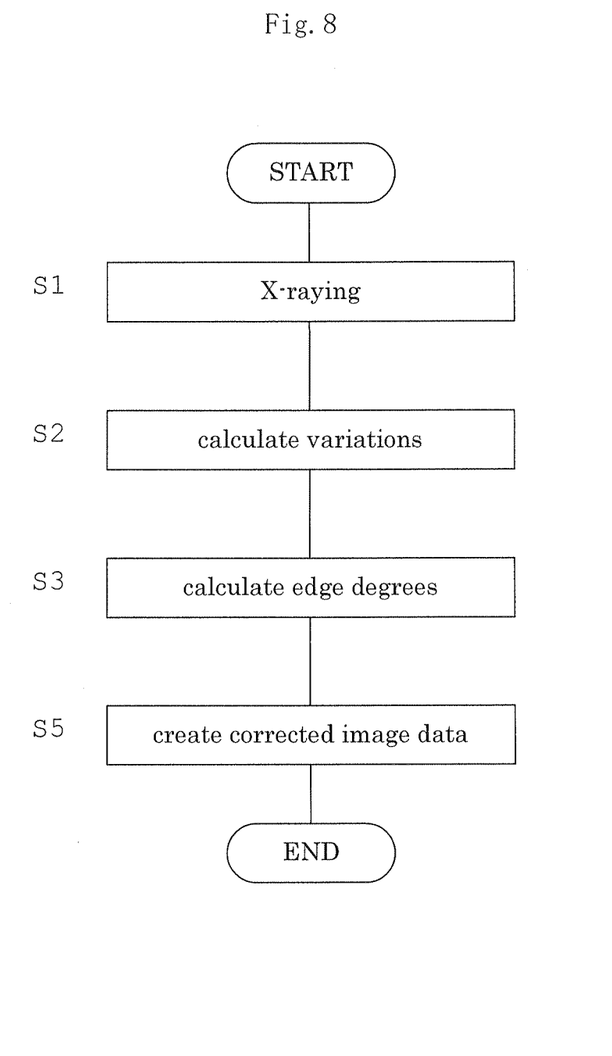
FIG. 8 is a flow chart showing a sequence of operation of the X-ray imaging apparatus.

Next, operation of the X-ray imaging apparatus according to Embodiment 2 will be described centering on the processes by the image processor 13. FIG. 8 is a flow chart showing a sequence of operation of the X-ray imaging apparatus. The processes described in Embodiment 1 will be described in a simplified way.

<Step S1> X-Raying

An X-raying operation is carried out under control of the radiography controller 7. The collector 11 outputs input image data to the image processor 13.

<Step S2> Calculate Variations (Variation Calculating Step)

The variation calculator 21 carries out arithmetic processes for calculating a variation SX of each pixel, and for determining variations SY in pixel value A relative to adjacent pixels in the longitudinal direction. In the following description, discrimination is made, as appropriate, between variations SX in the transverse direction and variations SY in the longitudinal direction.

A variation SY(x, y) in the longitudinal direction, for example, has a value of a difference between pixel value A(x, y+1) of the lower adjacent pixel and pixel value A(x, y−1) of the upper adjacent pixel, divided by 2. A relational expression between variation SY and pixel value A in this case is shown in Mathematical Expression 3.

$$SY(x, y) = \frac{A(x, y+1) - A(x, y-1)}{2}$$ [Math 3]

The variations SX, SY calculated for the respective adjoining directions of pixels adjacent each pixel are outputted to the edge degree calculator 23.

<Step S3> Calculate Edge Degrees (Edge Degree Calculating Step)

The edge degree calculator 23, as in Embodiment 1, calculates an edge degree RX of each pixel from variations SX of a peripheral pixel group g corresponding to each pixel. Further, an edge degree RY is calculated from variations SY in the longitudinal direction of the peripheral pixel group g corresponding to each pixel. In the following description, discrimination is made, as appropriate, between edge degree RX in the transverse direction and edge degree RY in the longitudinal direction.

The edge degree RY in the longitudinal direction is, for example, a ratio of "variation increase and decrease range" in the longitudinal direction to "variation range summation" in the longitudinal direction. A relational expression between edge degree RY and variation SY in this case is shown in Mathematical Expression 4.

$$RY(x, y) = \frac{\left| \sum_{j=-4}^{j=4} \sum_{i=-4}^{i=4} SY(x+i, y+j) \right|}{\sum_{j=-4}^{j=4} \sum_{i=-4}^{i=4} |SY(x+i, y+j)|}$$ [Math 4]

The edge degree calculator 23 further calculates, for each pixel, a combined edge degree R combining the edge degree RX in the transverse direction and the edge degree RY in the longitudinal direction. The combined edge degree R is, for example, the square root of a value, divided by 2, of a sum of the square of edge degree RX and the square of edge degree RY. A relational expression between combined edge degree R, and edge degrees RX, RY in the transverse direction and longitudinal direction in this case is shown in Mathematical Expression 5. The combined edge degree R takes values 0 to 1 inclusive.

$$R(x, y) = \sqrt{\frac{RX(x, y)^2 + RY(x, y)^2}{2}}$$ [Math 5]

The combined edge degree R of each pixel calculated is outputted to the image corrector 26.

<Step S6> Create Corrected Image Data (Image Correcting Step)

The image corrector 26 carries out a process for acquiring a gray scale value corresponding to the combined edge degree R for each pixel by converting or increasing a minimum value to a maximum value of the combined edge degree R to a minimum gray scale value to a maximum gray scale value that can be displayed on the output unit 17, respectively. Also a process is carried out for converting pixel value A of each pixel into a gray scale value corresponding to its combined edge degree R. The pixels corrected in this way constitute corrected image data.

The image processor 13, in response to instructions of the operator, outputs results of the arithmetic processes of the variation calculator 21, edge degree calculator 23 and image corrector 26 to the output unit 17.

Thus, according to the image processing system provided for the X-ray imaging apparatus in Embodiment 2, the variation calculator 21 calculates variations RX and RY separately for the respective adjoining directions of pixels adjacent each pixel, and the edge degree calculator 23 calculates edge degrees RX and RY separately for each pixel based on the variations RX and RY in the respective directions. Further, combined edge degrees R combining these edge degrees RX and RY are calculated. With such edge degrees RX, RY and combined edge degrees R, even if a gradient of pixel values A is in an arbitrary direction, apart from the case of the longitudinal direction or transverse direction, an evaluation can be made appropriately of probabilities of the pixels being edges.

Since the image corrector 26 is provided which corrects pixel values A of corresponding pixels according to the combined edge degrees R, image data (corrected image data) highlighting pixels evaluated to be edges can be created with high accuracy.

EMBODIMENT 3

Figure 9:
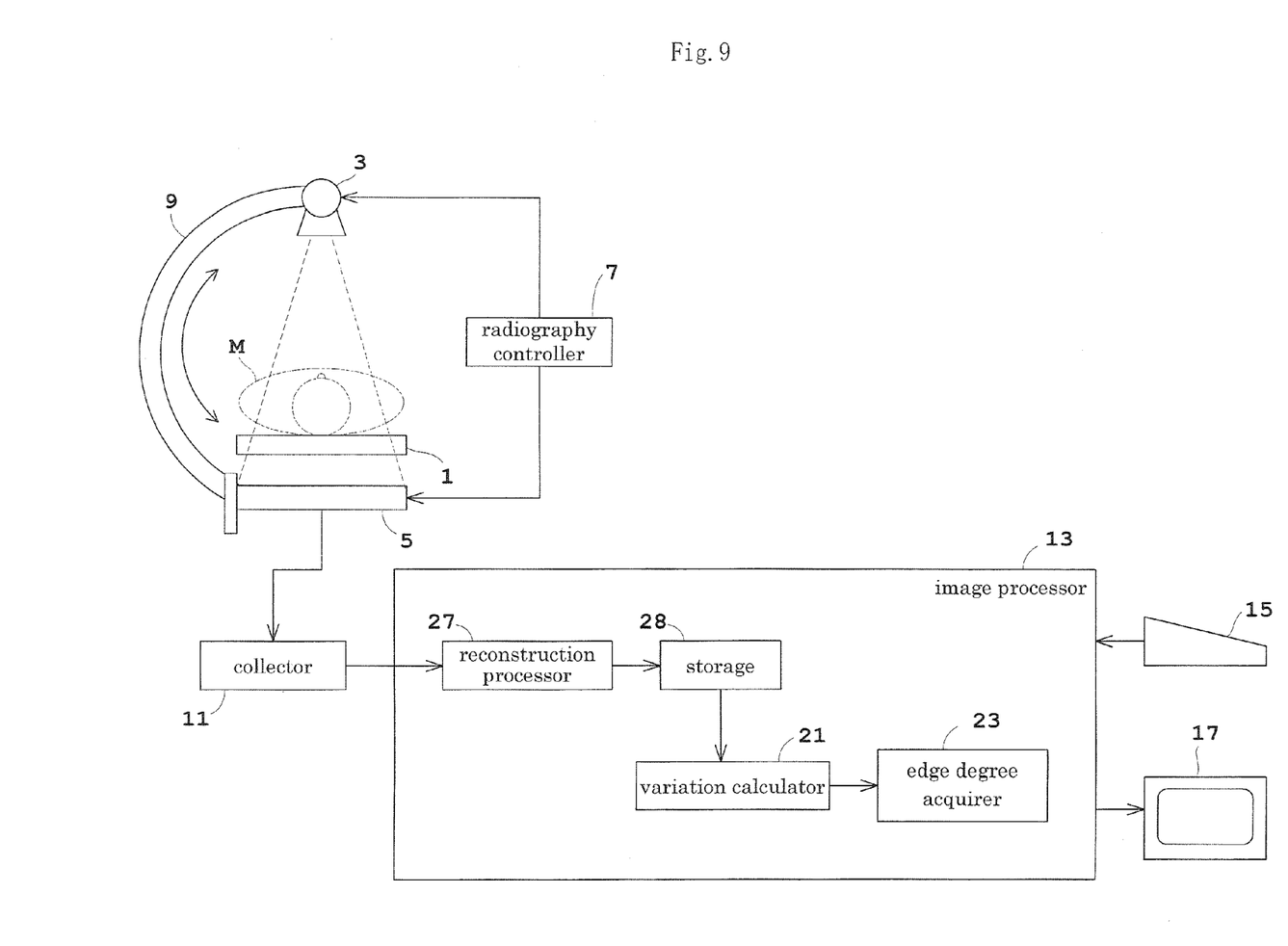
FIG. 9 is a block diagram showing an outline of an X-ray imaging apparatus according to Embodiment 3.

Embodiment 3 of this invention will be described hereinafter with reference to the drawings. FIG. 9 is a block diagram showing an outline of an X-ray imaging apparatus according to Embodiment 3. Parts identical to those of Embodiment 1 are affixed with the same signs, and will not particularly be described.

The X-ray imaging apparatus in Embodiment 3 carries out tomography. This apparatus includes a C-shaped arm 9 for revolvably supporting the X-ray tube 3 and FPD 5. The radiography controller 7 drives the C-shaped arm 9 to radiograph a subject M from varied angles.

The image processor 13 has a variation calculator 21, an edge degree calculator 23, a reconstruction processor 27 and a storage unit 28. Input image data outputted from the collector 11 is inputted to the reconstruction processor 27. The reconstruction processor 27 carries out a reconstruction arithmetic process based on the input image data, to create 3D image data. The 3D image data created is stored in the storage unit 28.

Figure 10:
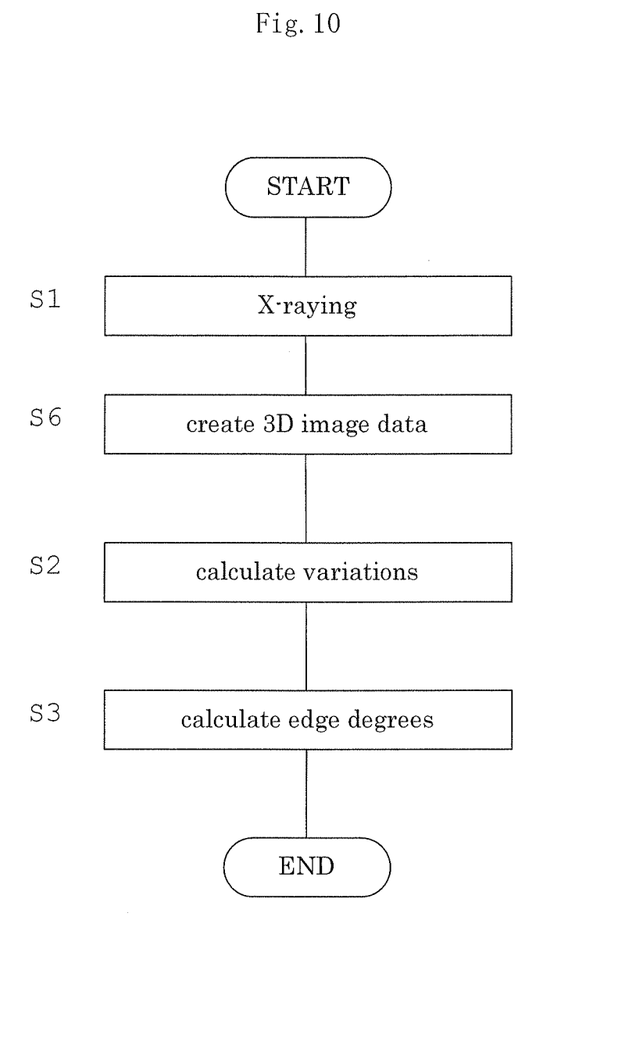
FIG. 10 is a flow chart showing a sequence of operation of the X-ray imaging apparatus.
Figure 11:
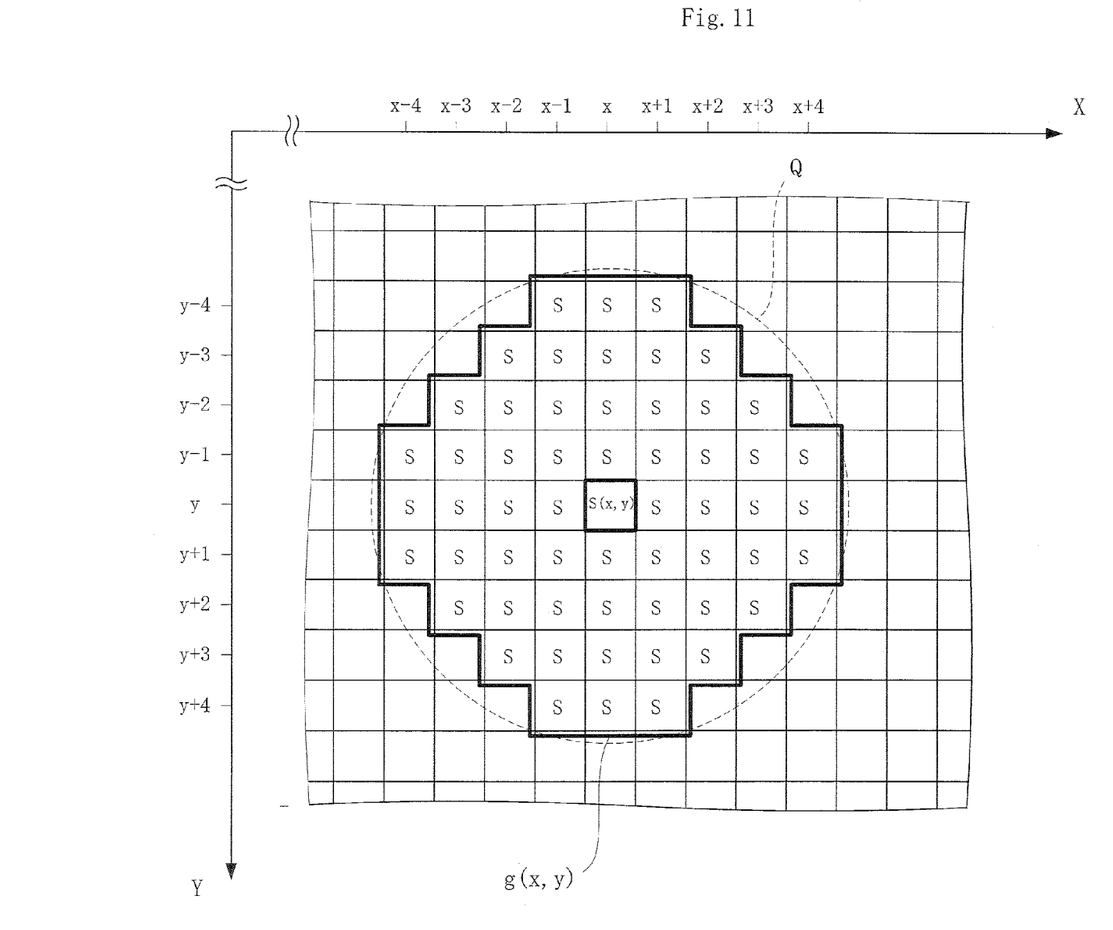
FIG. 11 is a view schematically showing a peripheral pixel group.

Next, operation of the X-ray imaging apparatus according to Embodiment 3 will be described centering on the processes by the image processor 13. FIG. 10 is a flow chart showing a sequence of operation of the X-ray imaging apparatus. The processes described in Embodiment 1 will be described in a simplified way.

<Step S1> X-Raying

An X-raying operation is carried out under control of the radiography controller 7. The collector 11 outputs input image data to the image processor 13.

<Step S6> Create 3D Image Data

The reconstruction processor 27 carries out a reconstruction arithmetic process based on the input image data to create 3D image data. The reconstruction arithmetic process includes, for example, processes of convolution using a suitable reconstruction function, and back projection of convolution results. The 3D image data created is stored in the storage unit 28.

<Step S2> Calculate Variations (Variation Calculating Step)

The variation calculator 21 reads the 3D image data from the storage unit 28. The 3D image data read is regarded as having pixels arranged in three orthogonal directions. For convenience, these three directions are called X-axis, Y-axis and Z-axis, respectively.

The variation calculator 21 calculates a variation SX in the X-axis direction for each pixel. The variation SX(x, y, z) is, for example, a value of a difference between pixel value A(x+1, y, z) and pixel value A(x−1, y, z) divided by 2. Similarly, a variation SY in the Y-axis direction and a variation SZ in the Z-axis direction are calculated for each pixel. The variations SX, SY and SZ calculated for each pixel are outputted to the edge degree calculator 23.

<Step S3> Calculate Edge Degrees (Edge Degree Calculating Step)

The edge degree calculator 23 carries out an arithmetic process to derive an edge degree RX of each pixel from variations SX of a peripheral pixel group g corresponding to each pixel. Here, the peripheral pixel group g includes, for example, a total of 729 pixels which is a common portion of nine rows in the X-, Y- and Z-directions having that pixel at the center. An example of relational expression between edge degree RX and variation SX is shown in Mathematical Expression 6.

$$RX(x, y, z) = \frac{\left|\sum_{j=-4}^{j=4}\sum_{i=-4}^{i=4}\sum_{k=-4}^{k=4} SX(x+i, y+j, z+k)\right|}{\sum_{j=-4}^{j=4}\sum_{i=-4}^{i=4}\sum_{k=-4}^{k=4} |SX(x+i, y+j, z+k)|}$$ [Math 6]

The edge degree calculator 23 similarly calculates edge degrees RY, RZ of each pixel from variations SY, SZ of the peripheral pixel group g of each pixel. Then, the edge degrees RX, RY and RZ are combined to obtain a combined edge degree R. An example of relational expression between combined edge degree R and edge degrees RX, RY and RZ is shown in Mathematical Expression 7.

$$R(x, y, z) = \sqrt{\frac{RX(x, y, z)^2 + RY(x, y, z)^2 + RZ(x, y, z)^2}{3}}$$ [Math 7]

The image processor 13, in response to instructions of the operator, outputs results of the arithmetic processes of the reconstruction processor 27, variation calculator 21 and edge degree calculator 23 to the output unit 17.

Thus, according to the image processing system provided for the X-ray imaging apparatus in Embodiment 3, the variation calculator 21 and edge degree calculator 23 provided allow an evaluation to be made appropriately of probabilities of the pixels being edges, also with respect to 3D image data.

This invention is not limited to the foregoing embodiments, but may be modified as follows:

(1) In each of the foregoing embodiments, an edge degree is calculated for each pixel, but this is not limitative. A modification may be made such that, when, for example, the operator operates the input unit 15, and designates a pixel or pixels (the number of pixels may be singular or plural) for which the edge degree should be calculated, the edge degree calculator 23 calculates the edge degree for the designated pixel or pixels. Further, a modification may be made such that the variation calculator 21 calculates variations for peripheral pixels corresponding to the designated pixel or pixels.

(2) In each of the foregoing embodiments, both input image data and 3D image data have been described as having pixels arranged along two axes or three axes perpendicular to one another. Instead of being limited to this, application may be made to image data having an arbitrary pixel arrangement.

(3) In each of the foregoing embodiments, the peripheral pixel group g is illustrated in FIG. 6, but this is not limitative. As shown in FIG. 10, for example, for any one arbitrary pixel (x, y), pixels present in a circular area Q substantially centering on that pixel may be set as the peripheral pixel group g(x, y). This can make distances from one position pixel to the remotest pixels in all directions substantially the same. The number of pixels in the peripheral pixel group may be varied as appropriate as long as it is two or more.

(4) In each of the foregoing embodiments, the variations have been illustrated specifically, but this is not limitative. For example, variation SX(x, y) may be a difference between A(x+1, y) and A(x, y). Or variation SX(x, y) may be a difference between A(x, y) and A(x−1, y).

(5) In each of the foregoing embodiments, the directions of variations have been illustrated specifically as the transverse direction and longitudinal direction, or the X-axis, Y-axis and Z-axis directions. Instead of being limited to this, a modification may be made to calculate variations for arbitrary directions such as oblique directions.

(6) In each of the foregoing embodiments, the edge degree is a ratio of "variation increase and decrease range" to "variation range summation", but this is not limitative. For example, in order to express this in percentage, the edge degree may have a value obtained by multiplying the above ratio by 100. Alternatively, the square of the above ratio may be made edge degree RX'. A relational expression between edge degree RX' and variation SX in this case is shown in Mathematical Expression 8.

$$RX'(x, y) = \left\{\frac{\left|\sum_{j=-4}^{j=4}\sum_{i=-4}^{i=4} SX(x+i, y+j)\right|}{\sum_{j=-4}^{j=4}\sum_{i=-4}^{i=4} |SX(x+i, y+j)|}\right\}^2$$ [Math 8]

In this case, when a combined edge degree R is acquired by combination with edge degree RY' obtained similarly, the foregoing Mathematical Expression 5 may be used, but the following Mathematical Expression 9 may be used instead.

$$R(x, y) = \sqrt{\frac{RX'(x, y) + RY'(x, y)}{2}} \qquad [\text{Math 9}]$$

(7) In Embodiment 2 described hereinbefore, the image corrector 26 carries out correction according to the combined edge degree R. Instead of being limited to this, correction may be made according to edge degrees RX and RY.

(8) In each of the foregoing embodiments, the input image data corresponds to the detection results of FPD 5. Instead of being limited to this, a change may be made to image data obtained by an appropriate detecting device or imaging device. Further, the input image data is based on X-raying, but instead of being limited to this, a change may be made to other radiographic image data or optical image data. Although the use of the X-ray imaging apparatus is not identified, the X-ray imaging apparatus may, for example, be used in the medical field, or the industrial field such as for nondestructive testing, RI (Radio Isotope) inspection and so on.

The invention claimed is:

1. An edge evaluation method for evaluating probabilities that pixels constituting image data are edges, comprising:
    a variation calculating step for calculating a variation in pixel value of each pixel relative to adjacent pixels; and
    an edge degree calculating step for calculating, for one arbitrary pixel, an edge degree which expresses numerically a probability of the one pixel being an edge, based on variations of a peripheral pixel group consisting of the one pixel and surrounding pixels;
    wherein, when a total of absolute values substituting for the variations of the peripheral pixel group is regarded as a variation range summation; and
    an absolute value of a total of the variations per se of the peripheral pixel group is regarded as a variation increase and decrease range;
    the edge degree is a ratio of the variation increase and decrease range to the variation range summation, or a value corresponding to the ratio.

2. The edge evaluation method according to claim 1, wherein the peripheral pixel group corresponding to the one pixel is a set of pixels present in an area substantially around the one pixel.

3. The edge evaluation method according to claim 1, wherein:
    the adjacent pixels are a plurality of pixels adjoining each pixel in different directions;
    the variation calculating step calculates the variations separately for the respective adjoining directions of the pixels adjacent each pixel; and
    the edge degree calculating step calculates the edge degree of one pixel separately for each variation corresponding to each direction.

4. The edge evaluation method according to claim 3, wherein the edge degree calculating step further acquires a combined edge degree by combining the edge degrees in the respective directions.

5. The edge evaluation method according to claim 1, wherein the image data is 2D image data or 3D image data.

6. An edge detection method for detecting that pixels constituting image data are edges, comprising:
    a variation calculating step for calculating a variation in pixel value of each pixel relative to adjacent pixels;
    an edge degree calculating step for calculating, for one arbitrary pixel, an edge degree which expresses numerically a probability of the one pixel being an edge, based on variations of a peripheral pixel group consisting of the one pixel and surrounding pixels; and
    an edge detecting step for determining, based on a result of the edge degree being compared with a threshold value, that the one pixel is an edge;
    wherein, when a total of absolute values substituting for the variations of the peripheral pixel group is regarded as a variation range summation; and
    an absolute value of a total of the variations per se of the peripheral pixel group is regarded as a variation increase and decrease range;
    the edge degree is a ratio of the variation increase and decrease range to the variation range summation, or a value corresponding to the ratio.

7. An image correction method for correcting pixel values of pixels constituting image data, comprising:
    a variation calculating step for calculating a variation in pixel value of each pixel relative to adjacent pixels;
    an edge degree calculating step for calculating, for one arbitrary pixel, an edge degree which expresses numerically a probability of the one pixel being an edge, based on variations of a peripheral pixel group consisting of the one pixel and surrounding pixels; and
    an image correcting step for correcting a pixel value of the one pixel based on the edge degree;
    wherein, when a total of absolute values substituting for the variations of the peripheral pixel group is regarded as a variation range summation; and
    an absolute value of a total of the variations per se of the peripheral pixel group is regarded as a variation increase and decrease range;
    the edge degree is a ratio of the variation increase and decrease range to the variation range summation, or a value corresponding to the ratio.

8. An image processing system for evaluating probabilities that pixels constituting image data are edges, comprising:
    a variation calculating device for calculating a variation in pixel value of each pixel relative to adjacent pixels; and
    an edge degree calculating device for calculating, for one arbitrary pixel, an edge degree which expresses numerically a probability of the one pixel being an edge, based on variations of a peripheral pixel group consisting of the one pixel and surrounding pixels;
    wherein, when a total of absolute values substituting for the variations of the peripheral pixel group is regarded as a variation range summation; and
    an absolute value of a total of the variations per se of the peripheral pixel group is regarded as a variation increase and decrease range;
    the edge degree is a ratio of the variation increase and decrease range to the variation range summation, or a value corresponding to the ratio.

9. The image processing system according to claim 8, wherein the peripheral pixel group corresponding to the one pixel is a set of pixels present in an area substantially around the one pixel.

10. The image processing system according to claim 8, wherein:

the adjacent pixels are a plurality of pixels adjoining each pixel in different directions;

the variation calculating device calculates the variations separately for the respective adjoining directions of the pixels adjacent each pixel; and the edge degree calculating device calculates the edge degree of one pixel separately for each variation corresponding to each direction.

11. The image processing system according to claim 10, wherein the edge degree calculating device further acquires a combined edge degree by combining the edge degrees in the respective directions.

12. The image processing system according to claim 8, wherein the image data is 2D image data or 3D image data.

13. The image processing system according to claim 8, further comprising an edge detecting device for determining, based on a result of the edge degree being compared with a threshold value, that the one pixel is an edge.

14. The image processing system according to claim 8, further comprising an image correcting device for correcting a pixel value of the one pixel based on the edge degree.

15. The image processing system according to claim 8, wherein the edge degree calculating device calculates the edge degree of each pixel constituting the image data.

16. The image processing system according to claim 8, further comprising an input device for designating pixels for which the edge degree should be calculated, wherein the edge degree calculating device calculates the edge degree of the pixels designated by the input device.

17. The image processing system according to claim 8, further comprising an output device for outputting the edge degree.

18. The image processing system according to claim 8, wherein the image data can be inputted from outside.

* * * * *